(12) United States Patent  
Rolland et al.

(10) Patent No.: US 8,467,488 B2  
(45) Date of Patent: Jun. 18, 2013

(54) METHOD OF SYNCHRONIZING TWO ELECTRONIC DEVICES OF A WIRELESS LINK, IN PARTICULAR OF A MOBILE TELEPHONE NETWORK AND SYSTEM FOR IMPLEMENTING THIS METHOD

(75) Inventors: Alain Rolland, Quincy Sous Senart (FR); Stéphane Blanc, Breuillet (FR); Jean-Christophe Plumecoq, Palaiseau (FR)

(73) Assignee: E-Blink, Boussy Saint Antoine (FR)

( * ) Notice: Subject to any disclaimer, the term of this patent is extended or adjusted under 35 U.S.C. 154(b) by 47 days.

(21) Appl. No.: 12/306,306

(22) PCT Filed: Jul. 5, 2007

(86) PCT No.: PCT/FR2007/051602  
§ 371 (c)(1),  
(2), (4) Date: Apr. 20, 2009

(87) PCT Pub. No.: WO2008/003911  
PCT Pub. Date: Jan. 10, 2008

(65) Prior Publication Data  
US 2009/0252267 A1      Oct. 8, 2009

(30) Foreign Application Priority Data

Jul. 7, 2006 (EP) .................................. 06291127

(51) Int. Cl.  
*H04L 7/04* (2006.01)

(52) U.S. Cl.  
USPC ........................................... 375/362; 375/354

(58) Field of Classification Search  
USPC .................................................. 375/362, 354  
See application file for complete search history.

(56) References Cited

U.S. PATENT DOCUMENTS 4,806,878 A * 2/1989 Cowley ......................... 331/1 A  
6,349,214 B1 * 2/2002 Braun ............................ 455/502

FOREIGN PATENT DOCUMENTS

DE   3 108 901 A1   9/1982  
EP   1 501 215 A1   1/2005  
EP   1 648 099 A1   4/2006

* cited by examiner

*Primary Examiner* — Shuwang Liu  
*Assistant Examiner* — Nader Bolourchi  
(74) *Attorney, Agent, or Firm* — Carr & Ferrell LLP

(57) ABSTRACT

A method of synchronizing two electronic devices connected by a wireless link with at least one path including a transmission channel and a reception channel. The two devices are included in a network, such as a mobile telephone network. Synchronization information is transmitted directly from one electronic device to the other, as a clock pilot signal, via the channels. After recovery, the clock pilot signal is used for synchronization of a reference frequency of the receiving electronic device.

17 Claims, 3 Drawing Sheets

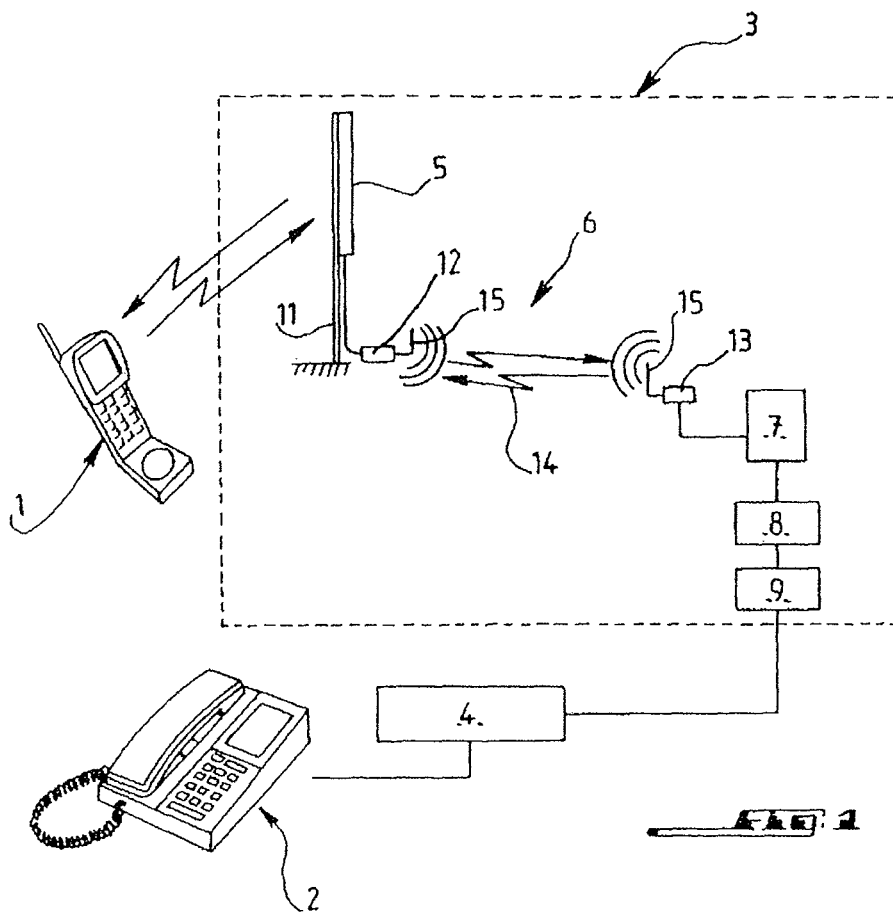
Fig. 1
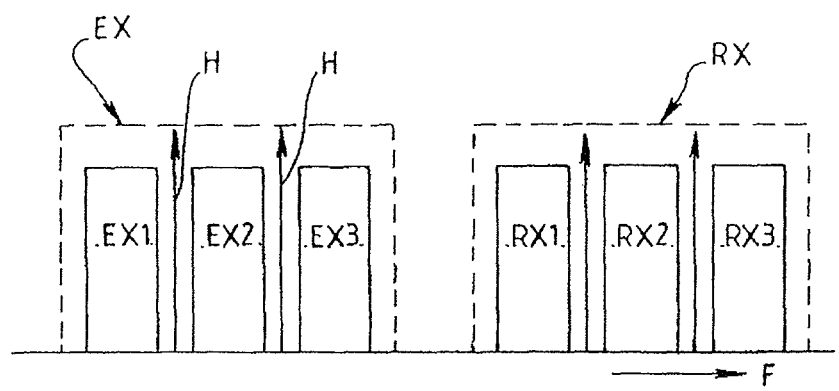
Fig. 2

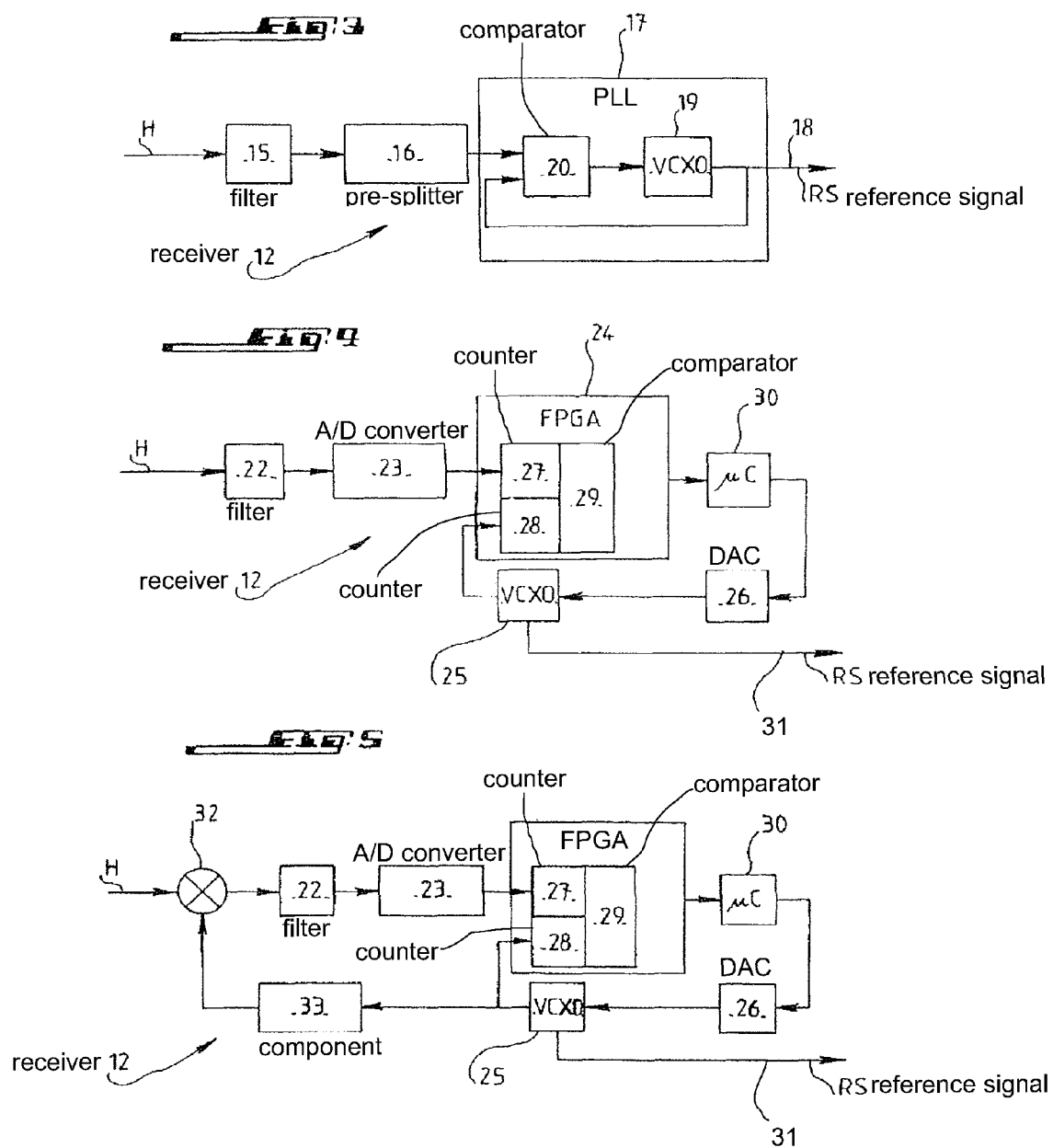

METHOD OF SYNCHRONIZING TWO ELECTRONIC DEVICES OF A WIRELESS LINK, IN PARTICULAR OF A MOBILE TELEPHONE NETWORK AND SYSTEM FOR IMPLEMENTING THIS METHOD

FIELD OF THE INVENTION

The invention concerns a method of synchronizing two electronic devices of a wireless electrical signal transmission link, in particular of a mobile telephone network, according to which the synchronization information is transmitted from one device to the other. The invention also concerns a system for implementing this method.

BACKGROUND

The standards in force for mobile telephone networks only tolerate a frequency error smaller than several millionths of the signal frequency. This demand requires perfect synchronization of the two devices. It is known to perform the synchronization directly on the frame and recover the clock upon reception. But the frequency stability thus obtained is insufficient.

The invention aims to resolve this drawback.

SUMMARY OF THE INVENTION

To achieve this aim, the method according to the invention is characterized in that one transmits the clock directly from one device to the other and uses this clock, after recovery, for synchronization of the reception device.

According to one characteristic of the invention, the method is characterized in that one transmits the clock signal in digital form.

According to another characteristic of the invention, the method is characterized in that one establishes, in the transmitter device, the digital value of the pilot signal, modulates the digital value on this pilot signal and transmits the latter modulated by its digital value to the reception device.

According to still another characteristic of the invention, the method is characterized in that one modulates, on the pilot signal, a frame comprising other information in addition to the digital value of the pilot signal.

The system for the implementation of the method according to the invention is characterized in that the reception device essentially comprises a local oscillator component generating the reference frequency, which is controlled by comparator means for the clock signal received at said reference signal.

According to one characteristic of the invention, the system is characterized in that the reception device comprises an analog digital converter and in that the control component of the local oscillator comprises counters for the digital clock signal and the reference signal and comparator means for the two counters, the local oscillator being controlled by a signal established from the result of the comparator.

According to another characteristic of the invention, the system is characterized in that, in the case of a high pilot frequency signal, the reception device comprises a mixer, the oscillator of which is controlled from the oscillator generating the reference signal.

According to still another characteristic of the invention, the system is characterized in that the transmitting device comprises means modulating the clock pilot signal by the digital value of the clock signal and in that the reception device comprises demodulator means.

According to still another characteristic of the invention, the system is characterized in that the means for modulating the pilot signal are adapted to modulate, on the latter, a frame comprising other information in addition to the digital value of the clock signal.

BRIEF DESCRIPTION OF DRAWING FIGURES

The invention will be better understood, and other aims, characteristics, details and advantages thereof will appear more clearly in the explanatory description which follows, done in reference to the appended diagrammatic drawings provide solely as an example illustrating one embodiment of the invention and in which:

FIG. 1 is a diagrammatic view illustrating the structure of a wireless communication system to which the invention is applicable;

FIG. 2 is a diagrammatic view illustrating the arrangement of a clock frequency in the frequency spectrum of a bidirectional link of a wireless communication system according to FIG. 1, according to the invention;

FIG. 3 is a diagrammatic view of a first embodiment of a clock synchronization device according to the invention;

FIG. 4 is a diagrammatic view illustrating a second embodiment of a clock synchronization device according to the invention;

FIG. 5 is a diagrammatic view illustrating a third embodiment of a clock synchronization device according to the invention;

DETAILED DESCRIPTION

Figure 6:
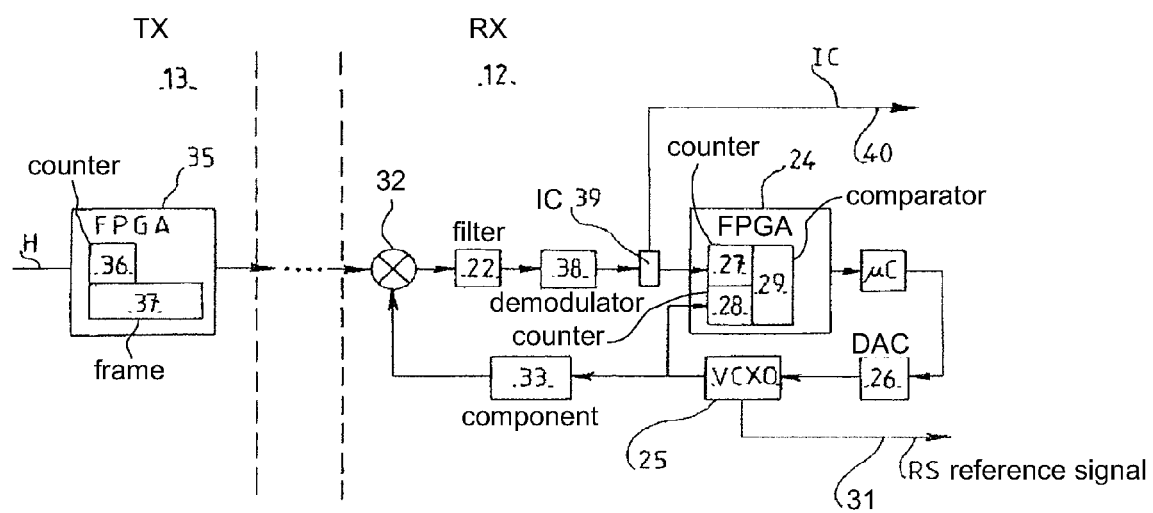
FIG. 6 is a diagrammatic view illustrating a fourth embodiment of a clock synchronization device according to the invention.

The method according to the invention, in its different embodiments and devices implementing these methods, can advantageously be used in the framework of a wireless transmission system as illustrated, as an example, in FIG. 1. This figure illustrates a communication system between a mobile telephone 1 and a fixed telephone 2 via a mobile telephone network 3, hereinafter network 3, and a fixed network 4. Inside the mobile telephone network 3, the communication passes through a relay antenna 5, hereinafter antenna 5, intended to communication with the mobile telephone 1, a data transmission link 6, hereinafter link 6, and a radio communication bay 7 generally called BTS (Base Transceiver System) of a fixed base station which, also comprises a base control station 8 commonly called BSC (Base Station Control) and a communication center 9 called MSC (Mobile Switching Center). The wireless link between the antenna 5 and the BTS bay 7 comprises an electronic device in the form of an electronic box 12, hereinafter box 12, connected to the relay antenna 5 and an electronic device in the form of an electronic box 13, hereinafter box 13, connected to the BTS bay 7. The transmission of signals between these two boxes is done by radiofrequency signals, i.e., wireless, as illustrated by reference 14. A system of this type is described in document WO 2005/05107.

The invention concerns the synchronization of the two boxes 12, 13 in order to ensure high frequency stability of the signals exchanged.

As shown by FIG. 2, a bidirectional link of the type of the link 6 comprises at least one path including a transmission channel EX and a reception channel RX and, in general, a plurality of bidirectional paths with two channels EX, RX. As seen in the figure, the EX channels of these paths on one hand, and the RX channels on the other hand, are grouped together. Thus the figure shows a group of three channels EX1, EX2, EX3 and a group of three reception channels RX1, RX2 and RX3.

According to the invention, the synchronization of the electronic boxes 12 and 13 of the network 3 is done by the direct transmission of the clock information H from one box to the other, for example from the box 13 to the box 12, and the recovery of the clock upon reception in order to synchronize the reception box on the transmitter box. This direct transmission from the clock is done by arrangement of the clock H between the two channels EX and RX of a single-path link and, in the case of a link with several paths shown in FIG. 2, between two adjacent transmission channels.

FIGS. 3 to 6 illustrate several possibilities or embodiments of the method according to the invention, each consisting of directly sending the clock H from the transmitter box to the receiver box and recovering it in the receiver box in the band RX.

According to a first embodiment of the invention, illustrated in FIG. 3, the clock pilot signal H is transmitted for example by the box 13, placed in the transmission band EX, in the manner illustrated in FIG. 2, and received in the electronic box 12 which comprises to this end, at the input, a filter 15, and successively, if applicable, a pre-splitter 16 designed to perform splitting of the frequency if the latter is too high and a phase locked loop 17 at the output terminal 18 of which the reference signal RS is available synchronized by the clock H and which has great spectral purity. To this end, the locked loop 17 comprises a voltage-controlled crystal oscillator, known under the name VCXO, which is controlled by a by a phase locked loop component 20 comprising two inputs connected to the pre-splitter 16 and the output of the oscillator 19, i.e., the output terminal 18 of the reference RS, respectively.

The device according to FIG. 3 provides for a pre-splitter because the reference frequency at the output terminal 18 must not exceed several hundred MHz.

A third embodiment mixing the digital and analog technologies is based on the sending of a pilot signal H and the counting of the frequency. The device for implementing this method comprises, as shown in FIG. 4, a filter 22 of the pilot signal coming from the electronic box 13 and position in the transmission band, in the manner described above, a converter 23 which performs the conversion of the pilot signal from analog to digital, a programmable logic component 24, called FPGA, which is part of a loop also comprising a local oscillator component 25 of the VCXO type, i.e., voltage-controlled with a crystal, which is controlled by a control component 26 of the type known by the name DAC. The component receives orders from a microprocessor 30, the input of which is connected to the output of the FPGA component 24. The microprocessor could also be integrated into the FPGA. As seen in the figure, this FPGA component comprises a first counter 27 designed to count the digital signals coming from the converter 23, a second counter 28 designed to count the signals coming from the VCXO oscillator 25 as well as a circuit 29 for comparing the results of the two counters 27 and 28, of the frequency locked loop type whereof the output signal is applied to the microprocessor 30 which gives orders to the VCXO oscillator 25, via the control component 26, the synchronized reference signal RS being available at the output 31 of the VCXO oscillator 25.

This embodiment presents the advantage of separating the frequency domains of the pilot and the reference. In the event the operating speed of the FPGA component 24 only allows operation at frequencies below the GHz, one will pass through an intermediate frequency to increase the working frequency.

FIG. 5 illustrates the device for recovering the synchronized reference RS in the case of a high pilot frequency, i.e., greater than the typical operating frequency of an FPGA component. To this end, the device comprises, in addition to the device according to FIG. 4, upstream from the filter 22, a mixer 32 for lowering the frequency of the pilot signal H and, assembled between this mixer 32 and the local VCXO oscillator 25, a component 33 which comprises a second oscillator of the VCO type and a phase-locked loop.

The mixer 32 allows, on one hand, easier filtering of signals from the pilot and, on the other hand, working at a frequency compatible with the FPGA component. This method makes it possible to obtain a reference with very high spectral purity and very good stability.

Another embodiment, illustrated in FIG. 6, proposes an architecture which makes it possible both to synchronize the two electronic boxes with a reference of very high spectral purity, while also transmitting different information. This method is purely digital.

FIG. 6 illustrates this method. One will note that the architecture of the device of the reception box corresponds to that of the embodiment according to FIG. 5. However, in the electronic box 13, the pilot H is applied to the FPGA component noted 35 and counted by the counter 36 and this value of the counter is modulated on the pilot and therefore digitally transmitted to the electronic box 12 in the form of amplitude modulation of the pilot.

Upon reception, the pilot is transposed by the mixer 32 at a lower frequency level which is not, however, obligatory in the case of a very rapid calculator. Then the modulating signal is recovered in the demodulator 38 and the counter value of the synchronization reference, i.e., of the pilot, is compared in the FPGA component to the second counter 28 of the reference produced by the VCXO oscillator 25. From this comparison, a control signal is established and applied to this VCXO component in order to correct the frequency of the local oscillator thereof.

This embodiment of the invention makes it possible to transmit, in addition to the counter information from the synchronization pilot reference, other information by including, in the FPGA component of the electronic box 13 in a frame indicated in 37, in addition to the number of bits reserved for this counting result, a predetermined number of bits of other information. This communication information, noted IC, is separated in 39 from the digital value of the pilot H and available at the terminal 40. In this way, it is possible to transmit, in the communication frame, information such as alarms, control data, communication protocols between the base station and the antenna equipment or any other protocol.

This embodiment of the method makes it possible to completely free oneself from the stability of the pilot as well as from part of the communication parasites, insofar as the frequency of the pilot does not participate in the synchronization. Only the value of the counter resulting from the communication frames participates. The transmission of data from the frame in no case disturbs the operation of the system. It should be noted that even the loss of the synchronization signal for several frames does not cause any deterioration of stability. The solution being of a digital nature, encoding is easily possible to fight interference or pirating of the data.

The invention claimed is:

1. A method of synchronizing first and second electronic devices connected by a wireless link for transmission of electrical signals over paths, each path including a transmission channel and a reception channel, the first and second electronic devices being included in a network comprising a relay antenna and a radio communication bay, to each of which one of the first and second electronic devices is connected, the method comprising:

wirelessly transmitting counter information directly between the first electronic device and the second electronic device in a digital clock pilot signal over paths of the wireless link;

wherein the counter information is a value of a counter designated to count frequency of sending a pilot signal and wherein the value is used to modulate the pilot signal to generate the digital clock pilot signal; and using a recovered counter information, after recovery of the clock counter information from the digital clock pilot signal received wirelessly, for synchronization of a reference signal of the one of the first and second electronic devices receiving the digital clock pilot signal.

2. The method according to claim 1, including establishing, in the first electronic device, a digital value of the digital clock pilot signal, modulating the digital value on the digital clock pilot signal, and wirelessly transmitting the digital clock pilot signal, modulated by the digital value, from the first electronic device to the second electronic device.

3. The method according to claim 2, including modulating, on the digital clock pilot signal, a frame comprising information in addition to the digital value of the digital clock pilot signal.

4. The method according to claim 1, wherein the wireless transmission of the digital clock pilot signal directly between the first and second electronic devices occurs over a plurality of adjacent transmission channels.

5. A system for implementing the method according to claim 1, wherein the second electronic device comprises:

a local oscillator component generating the reference signal; and comparator means for controlling the local oscillator component, in response to the digital clock pilot signal wirelessly received, for synchronization of the reference signal.

6. The system according to claim 5, wherein the second electronic device comprises two counters respectively counting the digital clock pilot signal and the reference signal, the comparator means compares outputs of the two counters, and the local oscillator is controlled by a signal established by the comparator means.

7. The system according to claim 6, wherein the second electronic device comprises a mixer controlled by the local oscillator component that generates the reference signal.

8. The system according to claim 7, wherein the first electronic device comprises modulating means for modulating the digital clock pilot signal with the digital value of the digital clock pilot signal, and the second electronic device comprises demodulating means for demodulating the digital clock pilot signal that is wirelessly received to recover the digital value of the digital clock pilot signal.

9. The system according to claim 8, wherein the modulating means for modulating the digital clock pilot signal modulates, on the digital clock pilot signal, a frame comprising information in addition to the digital value of the digital clock pilot signal.

10. A method of synchronizing first and second electronic devices communicating via a wireless link, the first and second electronic devices being included in a network comprising a relay antenna and a radio communication bay, to each of which a respective one of the first and second electronic devices is connected, the method comprising:

wirelessly transmitting a clock pilot signal in digital form, information from the first electronic device to the second electronic device as a modulation of the digital clock pilot signal;

recovering counter information from a digital clock pilot signal received wirelessly;

wherein the counter information is a value of a counter designated to count frequency of the clock pilot signal and wherein the value is used to modulate the clock pilot signal to generate the digital clock pilot signal; and synchronizing a reference signal of the second electronic device with the first electronic device, using the recovered counter information.

11. The method according to claim 10, including establishing, in the first electronic device, a digital value of the digital clock pilot signal, modulating the digital value on the digital clock pilot signal, and wirelessly transmitting the digital clock pilot signal, modulated by the digital value, from the first electronic device to the second electronic device.

12. The method according to claim 11, including modulating, on the digital clock pilot signal, a frame comprising information in addition to the digital value of the digital clock pilot signal.

13. A system for implementing the method according to claim 10, wherein the second electronic device comprises:

a local oscillator generating the reference signal; and comparator means for controlling the local oscillator, in response to the digital clock pilot signal wirelessly received, for synchronizing of the reference signal of the second electronic device with the first electronic device.

14. The system according to claim 13, wherein the second electronic device comprises first and second counters respectively counting the digital clock pilot signal and the reference signal, the comparator means compares outputs of the first and second counters, and the local oscillator is controlled by a signal established by the comparator means.

15. The system according to claim 14, wherein the second electronic device comprises a mixer controlled by the local oscillator that generates the reference signal of the second electronic device.

16. The system according to claim 15, wherein the first electronic device comprises modulating means for modulating the digital clock pilot signal with the digital value of the digital clock pilot signal, and the second electronic device comprises demodulating means for demodulating the digital clock pilot signal that is wirelessly received and for recovering the digital value of the digital clock pilot signal from the digital clock pilot signal.

17. The system according to claim 16, wherein the modulating means for modulating the digital clock pilot signal modulates, on the digital clock pilot signal, a frame comprising information in addition to the digital value of the digital clock pilot signal.

* * * * *

UNITED STATES PATENT AND TRADEMARK OFFICE
CERTIFICATE OF CORRECTION

PATENT NO. : 8,467,488 B2  
APPLICATION NO. : 12/306306  
DATED : June 18, 2013  
INVENTOR(S) : Alain Rolland et al.

Page 1 of 1

It is certified that error appears in the above-identified patent and that said Letters Patent is hereby corrected as shown below:

In the Specification

In column 2, line 59, delete the text "2005/05107" and insert the text --2005/051017--.

Signed and Sealed this  
Twenty-second Day of December, 2015

Michelle K. Lee  
*Director of the United States Patent and Trademark Office*